United States Patent
Garvey

[11] 3,904,025
[45] Sept. 9, 1975

[54] SPIRAL CONVEYOR
[75] Inventor: Francis J. Garvey, Conewall, N.J.
[73] Assignee: Garvey Corporation, Blue Anchor, N.J.
[22] Filed: Nov. 23, 1973
[21] Appl. No.: 418,206

[52] U.S. Cl. .................................. 198/136; 198/17
[51] Int. Cl. ............................................. B66b 9/12
[58] Field of Search ......... 198/136, 17, 182; 104/56

[56] References Cited
UNITED STATES PATENTS

| | | | |
|---|---|---|---|
| 719,751 | 2/1903 | Condon | 198/136 |
| 1,736,891 | 11/1929 | Thompson | 198/136 |
| 3,596,752 | 8/1971 | Garvey | 198/182 |
| 3,682,295 | 8/1972 | Roinestad | 198/136 X |

*Primary Examiner*—James B. Marbert
*Assistant Examiner*—Douglas D. Watts
*Attorney, Agent, or Firm*—O'Brien & Marks

[57] ABSTRACT

A spiral conveyor is disclosed as being constructed from a series of modular frames which are stacked vertically in accordance with the desired length of a conveyor. A conveyor chain is moved over a pair of spaced tracks by a plurality of hydraulic motors powered from a single hydraulic pump. These spaced tracks are mounted on the modular frames by means of support brackets spaced vertically and horizontally from each other to define a generally spiral configuration.

11 Claims, 10 Drawing Figures

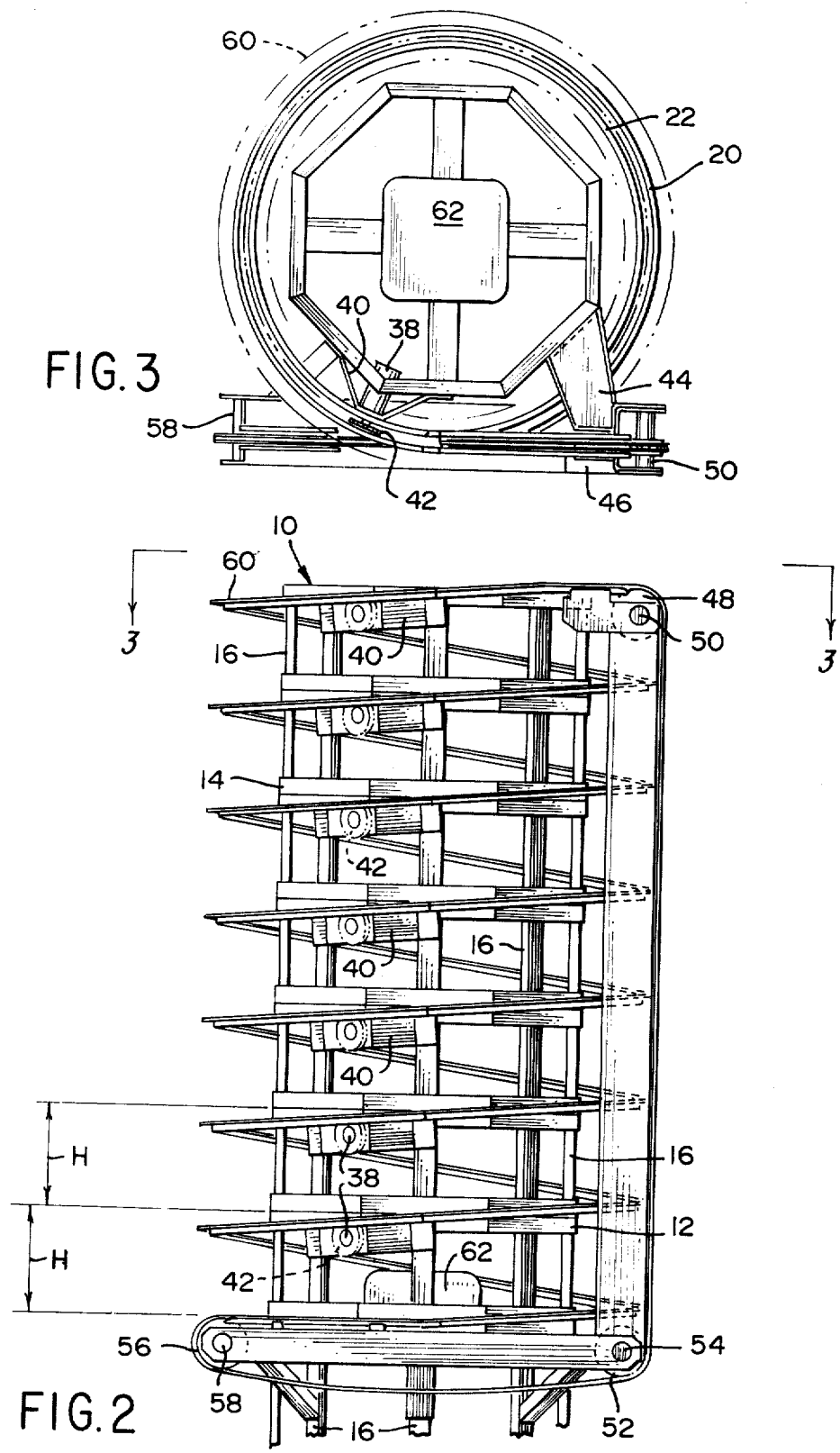

3,904,025

SPIRAL CONVEYOR

BACKGROUND OF THE INVENTION

1. Field of the Invention

This invention relates to an endless conveyor and, in particular, to such a conveyor disposed in a vertical spiral configuration.

2. Description of the Prior Art

The prior art, as exemplified by U.S. Pat. Nos. 1,948,435 and No. 3,682,295, is generally cognizant of the broad concepts of the spiral conveyors and hydraulic power systems for movement of the conveyor belt, chain or the like. While the prior art systems have been satisfactory for their specific design, they are costly to construct and operate and are limited to the predesigned height requirements with no provisions for height variations. In addition, the construction and arrangement of the prior art conveyors has been directed to the use of hydraulic systems wherein only a single hydraulic motor is utilized for the uphill direction of the conveyor with a single hydraulic motor being used for the downhill direction of the conveyor. The prior art devices suffer the further deficiencies of being complex structures requiring intricate and complicated conveyor paths and controls therefor.

SUMMARY OF THE INVENTION

The present invention is summarized in that a spiral conveyor is constructed to include a plurality of drive means spaced from each other, idler means spaced from the drive means, endless conveyor means having a driven portion engaging the drive means and a return portion engaging the idler means, power means operatively connected to the drive means for simultaneously moving same, a plurality of modular frames each having matching upper and lower members whereby the modular frames are stacked in vertical relation to each other, and track means on each frame spaced outwardly therefrom and being disposed in a generally spiral configuration for supporting the driven portion of the endless conveyor means.

An object of the present invention is to construct a spiral conveyor in a simple and economical manner.

Another object of this invention is to arrange a spiral conveyor in modular frames permitting the height of the conveyor to be varied in accordance with installation requirements.

The present invention has another object in that a spiral vertical conveyor is operated from a plurality of hydraulic motors disposed in parallel circuit arrangement.

It is another object of this invention to provide a spiral conveyor with tracks supported outwardly of a conveyor frame and with a return path for the conveyor disposed outwardly of the tracks.

Other objects and advantages of the present invention will become apparent from the following description of the preferred embodiment taken in conjunction with the accompanying drawings.

BRIEF DESCRIPTION OF THE DRAWINGS

FIG. 2 is a partially elevated view of a spiral conveyor as shown in FIG. 1;

FIG. 3 is a top plan view of FIG. 2 taken along line 3—3 of FIG. 2;

DESCRIPTION OF THE PREFERRED EMBODIMENT

Figure 1:
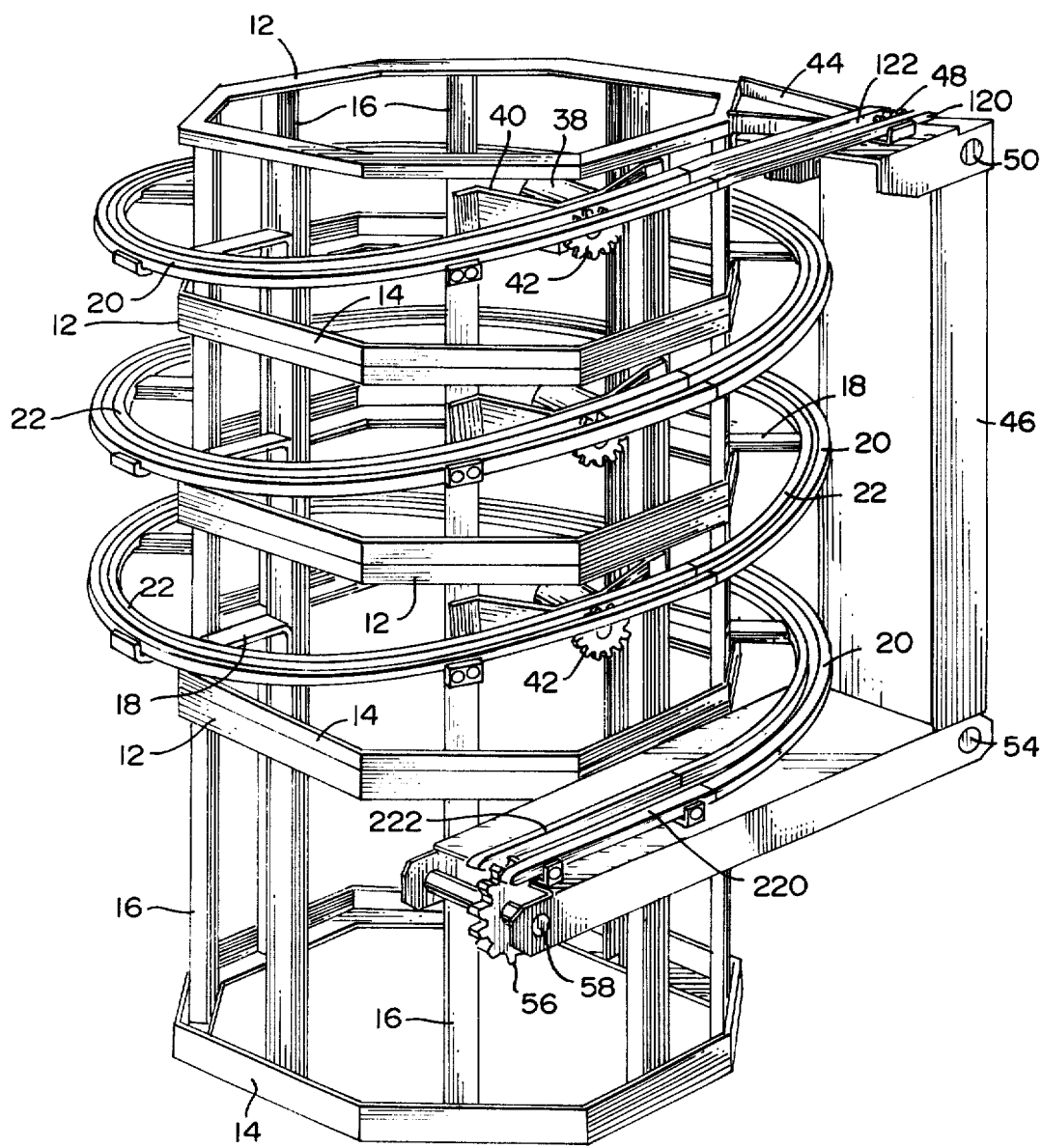
FIG. 1 is an asymmetric view of a spiral conveyor embodying the present invention with certain parts removed.
Figure 5:
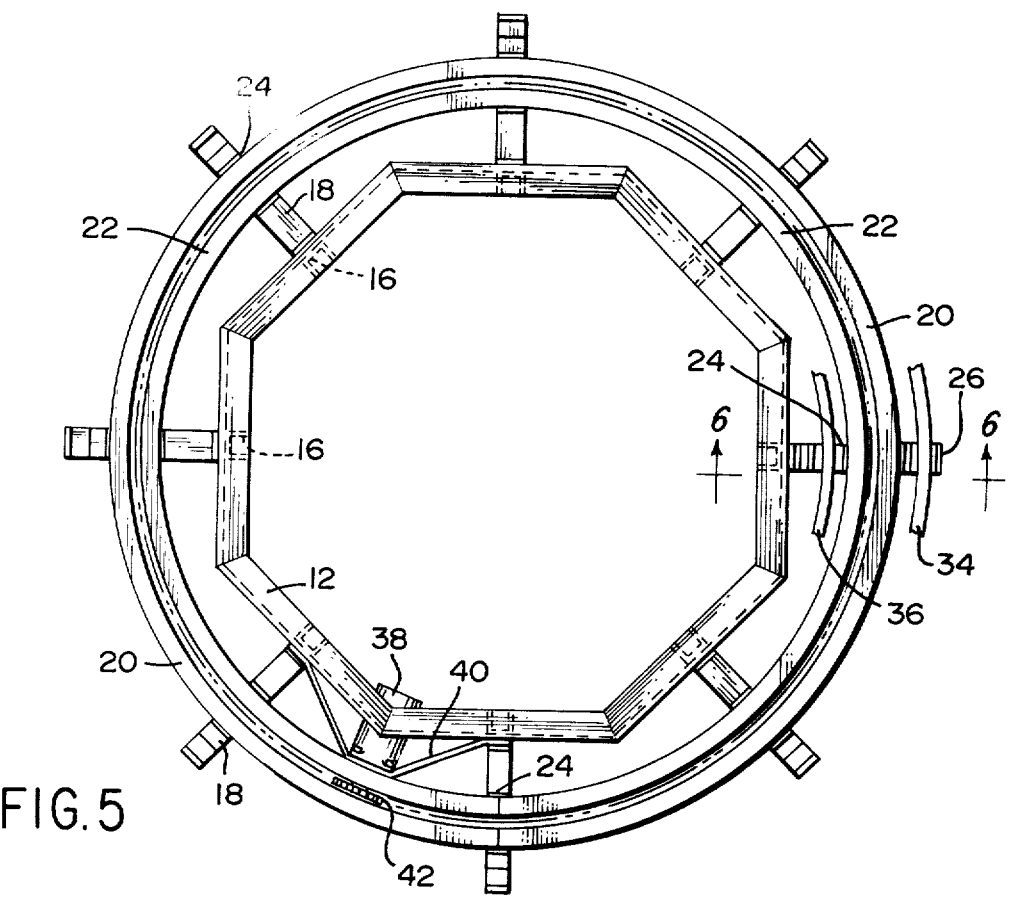
FIG. 5 is a top plan view of FIG. 4 taken along line 5—5 of FIG. 4.

As is illustrated in FIGS. 1–3, the present invention is embodied in a spiral vertical conveyor constructed on a skeletal framework having a plurality of frames 10 stacked vertically on each other. Each frame 10 includes upper and lower horizontal frame members 12 and 14 joined together by a plurality of spaced vertical frame elements 16. As viewed in FIG. 5, the upper horizontal frame members 12 present an octagonal configuration whereby eight vertical frame elements 16 are utilized. Eight mounting brackets 18 are spaced horizontally about the octagonal frame, one for each side, and each bracket has a generally transverse portion projecting outwardly from the octagonal frame in a substantially horizontal manner. The brackets 18 are also spaced vertically from each other in equal steps of progression; a pair of spaced tracks 20 and 22 curved in spiral shapes are supported on the brackets 18 to define a single loop of a spiral. The beginning of each spiral loop commences adjacent the lower edge of a frame member 14 (see FIG. 4) and terminates adjacent the upper edge of an aligned frame member 12. The tracks 20 and 22 may be made of any suitable material, such as plastic or steel, in accordance with installation requirements.

Figure 6:
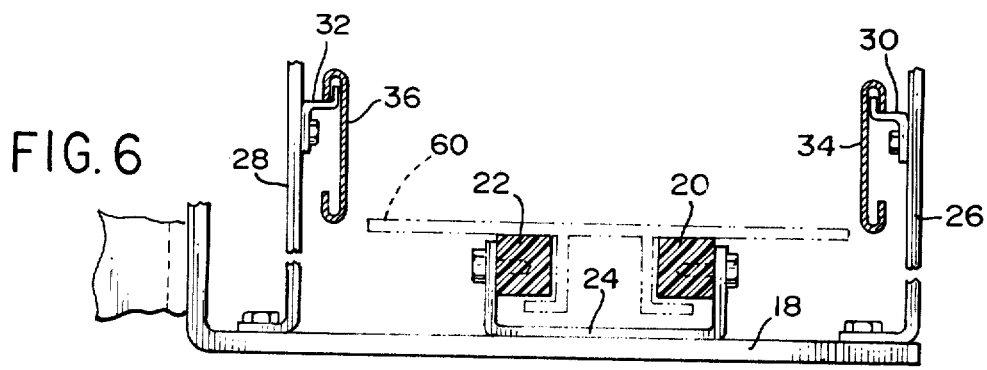
FIG. 6 is an enlarged cross section taken along line 6—6 of FIG. 5.

A generally U-shaped bracket 24 has its web fixed to the bracket 18 by any suitable means and provides a mounting for the tracks 20 and 22 which are respectively attached to the opposite legs of the bracket 24 as by screws in such a manner that upper bearing surfaces of the tracks 20 and 22 protrude slightly above the edges of the bracket legs (see FIG. 6). A pair of L-shaped outer and inner plates 26 and 28 are also attached to bracket 18 as by bolts and are spaced from each other so as to be on opposite sides of the U-shaped bracket 24. Offsetting hooks 30 and 32 are respectively bolted to upper portions of the plates 26 and 28 to provide supports for guide rails 34 and 36, respectively.

Figure 4:
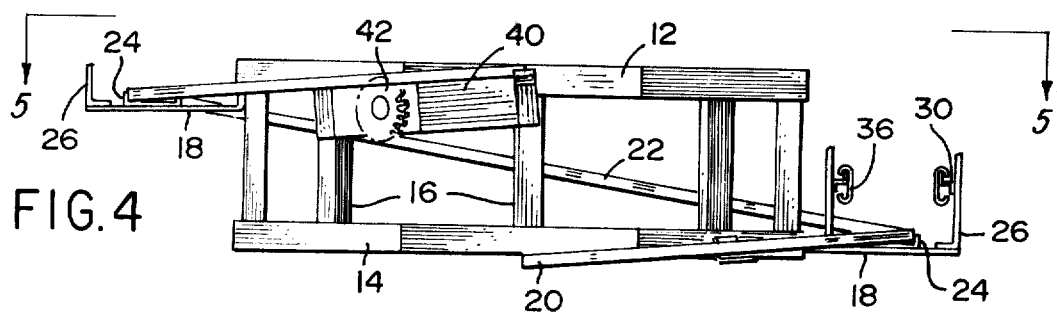
FIG. 4 is an enlarged elevation view of a detail of FIG. 3 with parts added.
Figure 7:
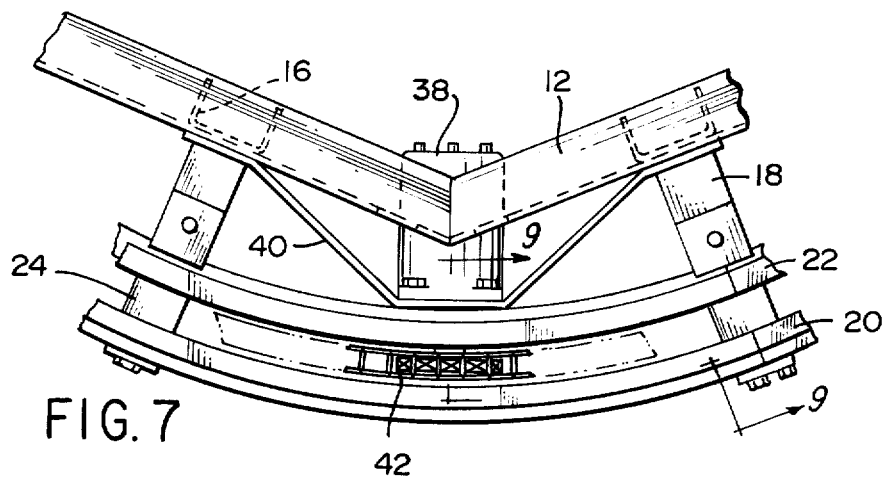
FIG. 7 is a fragmentary enlargement of a detail of FIG. 5.
Figure 8:
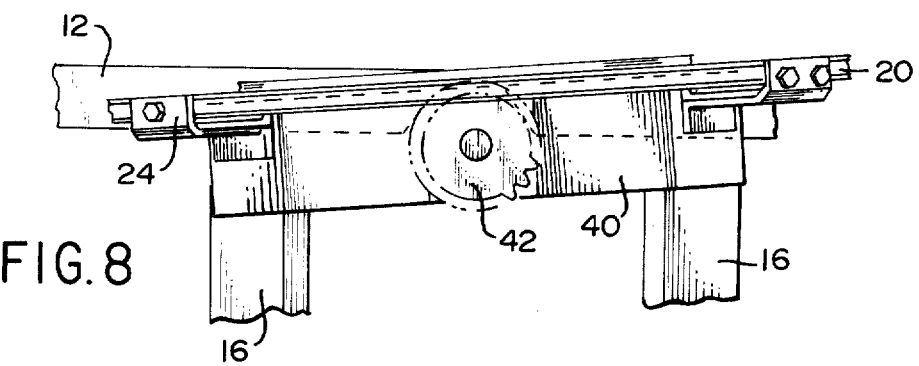
FIG. 8 is a front elevation view of FIG. 7.

A plurality of hydraulic motors 38 are spaced at locations along the spiral loops of the conveyor. Such locations are selected to meet specific requirements for particular installations. In the present embodiment, a single hydraulic motor 38 is utilized with each frame 10 being mounted thereon by a mounting bracket 40, as shown in FIG. 4; legs of the bracket 40 are fixed to a pair of adjacent vertical frame elements 16 (see FIGS. 7 and 8) while a central plate of the bracket 40 carries the motor 38 in such a manner that a drive gear or pinion 42 from the motor 38 is disposed between the spaced tracks 20 and 22 (see FIGS. 7 and 9).

Adjacent the upper horizontal frame member 12 of the uppermost frame 10 as shown in FIG. 1, a support plate 44 has one side fixed to the frame member 12 and an opposite side carrying an L-shaped housing 46. An upper idler gear 48 on an axle 50, a first lower idler gear 52 on an axle 54, and a second lower idler gear 56 on an axle 58 are mounted in the housing 46 with the upper gear 48 being disposed adjacent the uppermost frame 10 and the lower gears 52 and 56 being disposed adjacent the lowermost frame 10. The upper gear 48 protrudes between the ends of substantially horizontal extensions 120 and 122 of the outer and inner tracks 20 and 22, respectively; similarly, the second lower gear 56 protrudes between the opposite ends of substantially horizontal extensions 220 and 222 of the tracks 20 and 22, respectively.

Inasmuch as any suitable driving means may be substituted for the driving gears 42, any suitable flexible conveying platform may be utilized for the spiral conveyor. As is illustrated in FIG. 2, the conveying platform is in the form of an endless conveyor chain 60; the specific construction of the conveyor chain 60 includes a series of platform type links hinged together with undersurfaced pintles and bushings to be engaged by the driving gears 42. Specific examples of such conveyor chain constructions may be found in U.S. Pat. Nos. 2,564,533 and No. 2,911,091 which are incorporated herein by reference.

The spiral conveyor is powered by a variable displacement pump 62 driven by an electric motor of the type in the range of 3 to 3.5 horsepower with a speed of 1800 RPM. If the spiral conveyor contains only three hydraulic motors 38 (FIG. 1), the pump 62 may be a model PVB6 and if seven motors 38 are employed (FIG. 7), the pump may be a model PVB10; such models are manufactured by Vickers Division of Sperry Rand Corporation. A pressure compensator in the pump 62 automatically regulates the pump output to maintain volume requirements of the system at a preselected operating pressure.

Figures 9, 10:
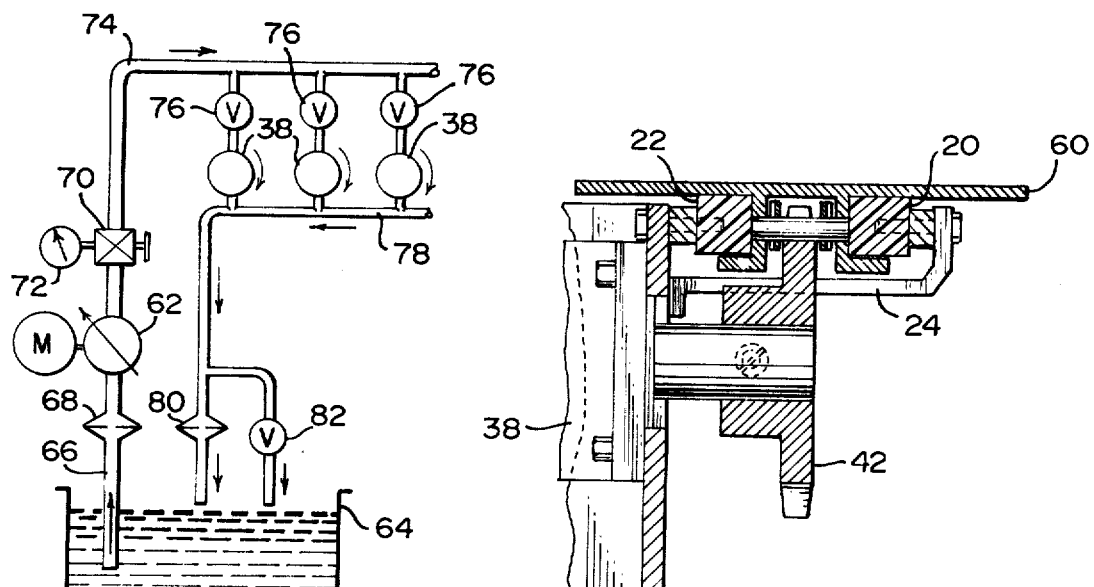
FIG. 9 is a cross section taken along the staggered line 9—9 of FIG. 7.
FIG. 10 is a schematic diagram of a hydraulic control system for the conveyor of FIG. 1.

The components of the hydraulic control system of FIG. 10 will be described in detail in conjunction with the following description of the sequence of operation. Movement of the conveyor chain 60 is initiated as by a start button of the motor of the pump 62. A petroleum base hydraulic fluid is then pumped from a reservoir 64 through a pipe 66 and filter 68 by the pump 62, thence through an on-off valve 70 having a pressure gauge 72 to a feed pipe 74. As is illustrated in FIG. 10, the motors 38 are disposed in parallel circuit arrangement with each motor having an adjustable flow control valve 76. Thus, the hydraulic circuit is traced from the feed pipe 74 through each valve 76 and its associated motor 38 to a return pipe 78, thence through a filter 80 to the reservoir 64. A bypass line shunts the filter and includes a check valve 82 adapted to permit flow at a predetermined selected pressure, e.g., 30 psi. Energization of the hydraulic motors 38 causes rotation of their chain sprockets 42 which engage the undersurface of the conveyor chain 60 as is shown in FIG. 9.

Assuming that the gears or sprockets 42 are rotating in a clockwise direction as viewed in FIG. 2, the conveyor chain 60 will be moving in an upwardly vertical spiral from the entrance tracks 220 and 222 to the exit tracks 120 and 122, then around the successive idler sprockets 48, 52 and 56. The goods to be moved along the conveyor are deposited on the conveyor chain 60 at the entrance tracks 220 and 222 and such goods, e.g., bottles, cans, containers, etc., are thus moved through a vertical distance H for each modular frame 10 that is used in the system. The goods are removed from the conveyor chain 60 at the exit tracks 120 and 122 where they are then deposited onto other conveying equipment as desired.

Since the conveyor chain 60 ties all the hydraulic motors 38 together by chain and sprocket engagement, the possibility of overload of any one particular motor 38 is virtually eliminated and any such overload is taken up by the other motors in the system. As shown in FIG. 2, each modular frame 10 has a hydraulic motor 38 mounted thereon and has tracks which define one loop of the spiral configuration moving through a height dimension H. Thus, it is an easy matter to compute the height through which the spiral conveyor is to operate without having to make a separate calculation with respect to size, number and location of the hydraulic motors 38.

The use of the plurality of hydraulic motors 38 in conjunction with the hydraulic pump 62 is also a particular advantage in that the conveyor chain 60 is reversible by merely reversing the direction of flow through the motors 38 as by reversing the feed line 74 and the return line 78 of the hydraulic circuit. In such an instance, the conveyor chain 60 will descend from the uppermost level to the lowermost level where the tracks 220 and 222 will define an exit station.

The reversibility of the conveyor chain 60 presents the further advantage that the vertical conveyor may be used as an accumulator for the storage of the goods during a particular operation associated with a plurality of conveying apparatuses. Thus, the goods could enter the conveying system at the entrance tracks 220 and 222 and move to the top vertical position at which point the conveying operation is deenergized. At any selected time thereafter, the conveyor chain 60 would be operated in reverse, i.e. a descending manner, returning the goods to the exit at tracks 220 and 222 so as to be again placed into the conveying system.

Inasmuch as the present invention is subject to many changes in detail, reversal in parts, and modifications, it is intended that all matter contained in the foregoing description or shown in the accompanying drawings shall be interpreted as illustrative and not in a limiting sense.

What is claimed is:

1. A spiral conveyor comprising
 a plurality of drive means spaced from each other,
 idler means spaced from said plurality of drive means,
 endless conveyor means having a driven portion engaging said plurality of drive means and a return portion engaging said idler means,
 power means operatively connected to said plurality of drive means for simultaneously driving the same,
 a plurality of modular frames, each modular frame of said plurality having upper and lower members, at least one of the upper and lower members of each modular frame being matched and aligned with at least one of the adjacent lower and upper members of an adjoining modular frame of said plurality whereby the plurality of modular frames of said conveyor are stacked in vertical and aligned relation to each other, and spiral track means spaced outwardly of and about each modular frame of said plurality and extending between the upper and lower members of each modular frame of said plurality so as to form a single spiral loop, the adjacent ends of the spiral track means of adjoining modular frames of said plurality being disposed in aligned and abutting end-to-end relationship so as to form a continuous spiral conveyor between the spiral track means of said plurality of modular frames when the plurality of modular frames of said conveyor are stacked in vertical and aligned relation to each other, said track means for each modular frame of said plurality including means supporting the driven portion of said endless conveyor means.

2. A spiral conveyor as claimed in claim 1 wherein said plurality of drive means comprises a plurality of hydraulic motors and wherein said power means comprises hydraulic pump means and hydraulic circuit means between said plurality of hydraulic motors and said hydraulic pump means.

3. A spiral conveyor as claimed in claim 2 wherein said track means comprises a pair of tracks disposed in spaced parallel relation to each other.

4. A spiral conveyor as claimed in claim 2 wherein said track means has a pair of tracks; said plurality of hydraulic motors are carried by said plurality of modular frames; and each hydraulic motor has a conveyor driven disposed between said pair of tracks.

5. A spiral conveyor as claimed in claim 3 wherein support means are spaced about each modular frame for supporting the spiral loop of said track means on each modular frame.

6. A spiral conveyor comprising
a plurality of drive means spaced from each other,
idler means spaced from said plurality of drive means,
endless conveyor means having a driven portion engaging said plurality of driven means and a return portion engaging said idler means,
power means operatively connected to said plurality of drive means for simultaneously driving the same,
a plurality of modular frames each having matching upper and lower members whereby the modular frames are stacked in vertical relation to each other, and
track means on each frame spaced outwardly therefrom and being disposed in a generally spiral configuration for supporting the driven portion of said endless conveyor means;
said plurality of driven means comprising a plurality of hydraulic motors, said power means comprising hydraulic pump means and hydraulic circuit means between said hydraulic motors and said hydraulic pump means; and
said track means comprising a pair of tracks disposed in spaced parallel relation to each other; and
support means being spaced about each modular frame for supporting said track means; and
said support means including a generally U-shaped bracket, said pair of tracks being carried by said U-shaped bracket so as to permit upper surfaces of said pair of tracks to protrude above said U-shaped bracket.

7. A spiral conveyor as claimed in claim 6 wherein said support means further includes a mounting bracket having one end fixed to its corresponding modular frame and a transverse portion extending therefrom and wherein said U-shaped bracket is secured to said transverse portion intermediate its ends.

8. A spiral conveyor as claimed in claim 7 wherein said support means further includes a pair of L-shaped plates attached to said transverse portion in spaced relation to each other on opposite sides of said U-shaped bracket and wherein guide rail means are suspended from said L-shaped plates to guide movement of goods being transported by said endless conveyor means.

9. A spiral conveyor as claimed in claim 4 wherein said conveyor driver comprises a chain sprocket and said endless conveyor means comprises a conveyor chain having an undersurface adapted for engagement by said chain sprocket for movement thereby.

10. A spiral conveyor as claimed in claim 9 wherein said idler means comprises a plurality of idler sprockets spaced outside of and away from said track means and said plurality of modular frames and being engaged by said conveyor chain during its return movement.

11. A spiral conveyor as claimed in claim 4 wherein said plurality of hydraulic motors are disposed in parallel circuit arrangement and wherein said hydraulic circuit means includes a fluid reservoir feeding said hydraulic pump means, a fluid feed line from said hydraulic pump means to said hydraulic motors, and a fluid return line from said plurality of hydraulic motors to said fluid reservoir.

* * * * *